3,501,569
ANTIBIOTICS NOGALAROL, O-METHYL-NOGALAROL AND NOGALARENE AND PRODUCTION THEREOF
Paul F. Wiley, Texas Township, Kalamazoo County, and Edgar Louis Caron, Jr., Kalamazoo Township, Kalamazoo County, Mich., assignors to The Upjohn Company, Kalamazoo, Mich., a corporation of Delaware
Filed June 29, 1967, Ser. No. 649,939
Int. Cl. A01n 9/20; A61k 21/00
U.S. Cl. 424—119  9 Claims

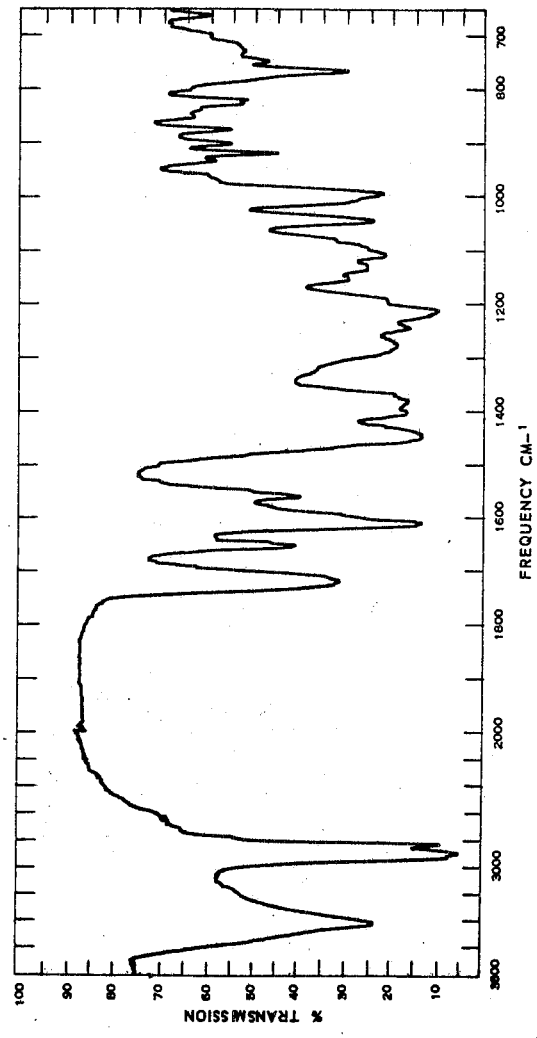

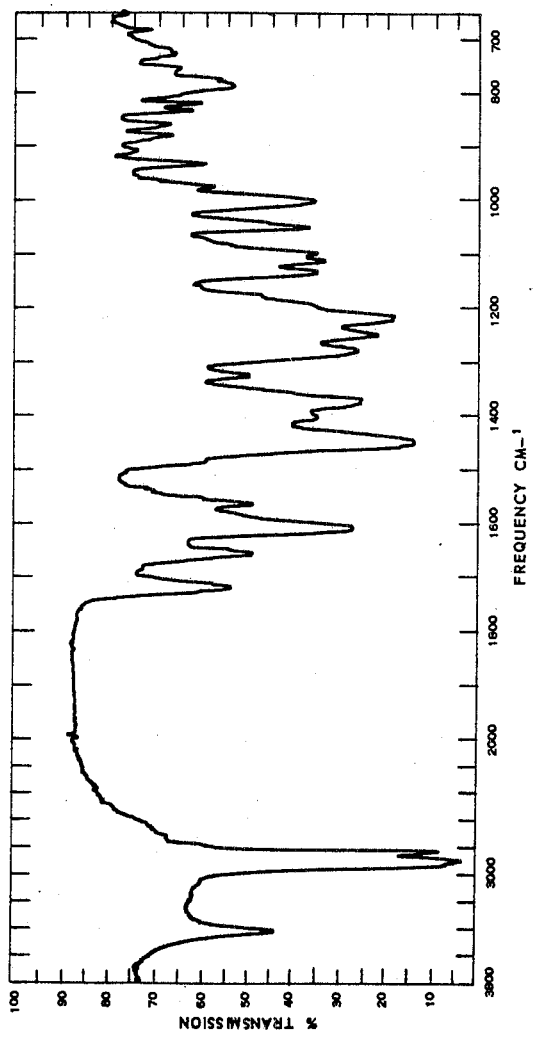

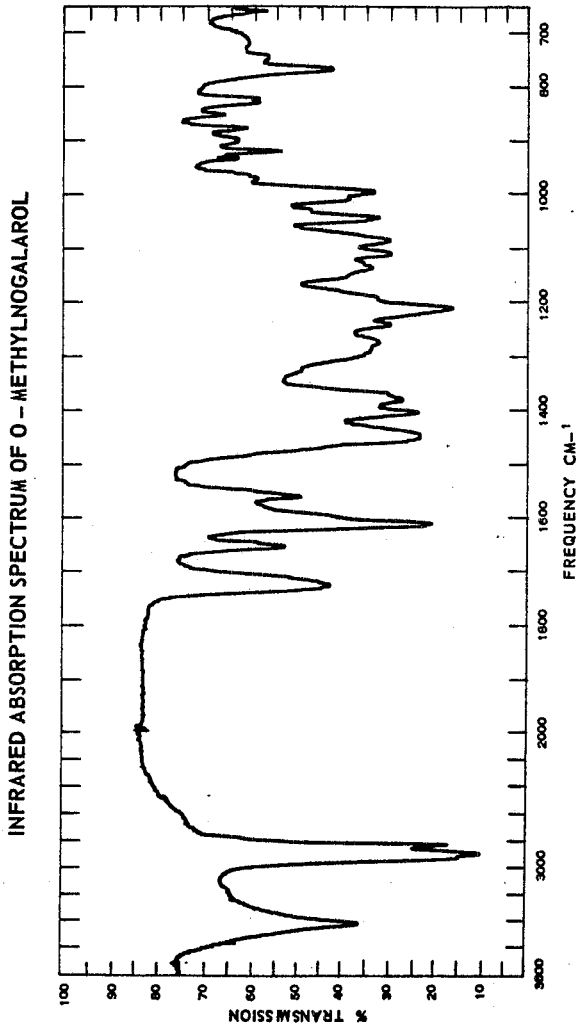

ABSTRACT OF THE DISCLOSURE

Antibiotics nogalarol (U–24,489) and nogalarene (U–23,041) produced by acid hydrolysis of the antibiotic nogalamycin, and O-methylnogalarol (U–23,482) produced by acidic methanolysis of nogalamycin or nogalarol. These compounds can be used to inhibit the growth of various microorganisms, for example, *Bacillus subtilis*, *Staphylococcus aureus*, *Streptococcus fecalis*, and *Lactobacillus casei*.

BRIEF SUMMARY OF THE INVENTION

Nogalarol and nogalarene are basic organic compounds obtained by acid hydrolysis of the antibiotic nogalamycin. O-methylnogalarol also is a basic organic compound which is produced by acidic methanolysis of nogalamycin or nogalarol. The preparation and properties of nogalamycin are described in U.S. Patent 3,183,157. Nogalarol, O-methylnogalarol, and nogalarene have the property of adversely affecting the growth of certain organisms, particularly bacteria, for example, *Bacillus subtilis*, *Bacillus cereus*, *Sarcina lutea*, *Staphylococcus aureus*, *Streptococcus fecalis*, *Mycobacterium phlei*, *Lactobacillus casei*, *Rhodopseudomonas spheroides*, and *Propionibacterium thoni*. Further, nogalarol is active against the protozoan *Crithidia fasciculata*. O-methylnogalarol has antitumor activity in mice against leukemia L–1210 which is greater than that exhibited by nogalamycin. Furthermore, O-methylnogalarol has about ⅒th the toxicity of nogalamycin in mice. Nogalarol, O-methylnogalarol, and nogalarene can be used alone or in combination with other antibacterial agents to prevent the growth of, or reduce the number of, such organisms present in various environments. For example, nogalarol, O-methylnogalarol, and nogalarene are useful in wash solutions for sanitation purposes, as in the washing of hands and the cleaning of equipment, floors, or furnishings of contaminated rooms or laboratories; they are also useful as industrial preservatives, for example, as bacteriostatic rinses for laundered clothes and for impregnating papers and fabrics; and they are useful for suppressing the growth of sensitive organisms in plate assays and other microbiological media.

BRIEF DESCRIPTION OF THE DRAWING

FIGURE 1 is infrared absorption spectrum of nogalarol.
FIGURE 2 is infrared absorption spectrum of nogalarene.
FIGURE 3 is infrared absorption spectrum of O-methylnogalarol.

DETAILED DESCRIPTION

Chemical and physical properties of nogalarol

*Elemental analysis.*—Calculated for $C_{29}H_{31}NO_{13}$ (percent): C, 57.91; H, 5.20; N, 2.33; O, 34.61. Found (percent): C, 57.66; H, 5.42; N, 2.34; O, 32.00.

*Equivalent weight.*—Calculated: 601.5. Found: 558.

*Solubility.*—Soluble in dilute acid and base (0.1 to 2 N), methanol, dimethylformamide and acetone. Relatively insoluble in propanol, butanol, and like higher alcohols; chloroform, methylene chloride, and like halogenated hydrocarbons.

*Titration.*—pKa' of 7.15.

*Ultraviolet spectrum.*—Nogalarol has the following UV absorption spectrum in $CH_3OH$:

| λ Max. (mμ) | ε |
|---|---|
| 234 | 53,250 |
| 258 | 24,600 |
| 288 (sh.) | 9,850 |
| 475 | 15,400 |

*Decomposition temperature.*—About 220° C. (No definite melting point).

*Color of crystals.*—Red needles.

*Infrared spectrum.*—The infrared absorption spectrum of nogalarol suspended in mineral oil mull is reproduced in FIGURE 1 of the drawing. Nogalarol gives bands at the following wavelengths expressed in reciprocal centimeters:

| | | |
|---|---|---|
| 3,440 (S) | 1,569 (M) | 1,014 (S) |
| 2,950 (S) (oil) | 1,559 (M) | 1,004 (S) |
| 2,940 (S) (oil) | 1,454 (S) (oil) | 975 (W) |
| 2,845 (S) (oil) | 1,414 (S) | 944 (W) |
| 2,780 (W) | 1,394 (S) | 929 (W) |
| 2,360 (W) | 1,379 (S) (oil) | 910 (W) |
| 1,739 (M) | 1,285 (S) | 884 (W) |
| 1,734 (M) | 1,254 (S) | 854 (W) |
| 1,725 (M) | 1,224 (S) | 836 (W) |
| 1,719 (M) | 1,204 (S) | 824 (W) |
| 1,709 (W) | 1,164 (S) | 809 (W) |
| 1,699 (W) | 1,139 (S) | 775 (S) |
| 1,674 (W) | 1,119 (S) | 759 (M) |
| 1,659 (M) | 1,104 (S) | 739 (W) |
| 1,604 (M) | 1,089 (M) | 709 (W) |
| 1,619 (S) | 1,054 (S) | 669 (W) |

Band intensities for the infrared absorption spectrums contained herein are indicated as S, M, and W, respectively, and are approximated in terms of the backgrounds in the vicinity of the bands. An S band is of the same order of intensity as the strongest in the spectrum; M bands are between one-third and two-thirds as intense as the strongest band; and W bands are less than one-third as intense as the strongest band. These estimates are made on the basis of a percent transmission scale.

CHEMICAL AND PHYSICAL PROPERTIES OF NOGALARENE

*Elemental analysis.*—Calculated for $C_{29}H_{27}NO_{11}$ (percent): C, 61.59; H, 4.82; N, 2.48. Found (percent): C, 61.73; H, 5.51; N, 2.56.

*Equivalent weight.*—Calculated: 565.5. Found: 564.

*Titration.*—pKa' of 7.04.

*Ultraviolet spectrum.*—Nogalarene has the following UV absorption spectrum in $CH_3OH$:

| λ Max. (mμ) | ε |
|---|---|
| 248 | 49,800 |
| 270 | 28,880 |
| 290 (sh.) | 16,300 |
| 303 (sh.) | 14,900 |
| 480 | 18,700 |

*Decomposition temperature.*—About 230° C. (No definite melting point).

*Infrared spectrum.*—The infrared absorption spectrum of nogalarene suspended in mineral oil mull is reproduced in FIGURE 2 of the drawing. Nogalarene gives bands at the following wave lengths expressed in reciprocal centimeters:

| | | |
|---|---|---|
| 3,420 (M) | 2,920 (S) (oil) | 2,780 (W) |
| 2,940 (S) (oil) | 2,840 (S) (oil) | 2,720 (W) |
| 1,724 (W) | 1,331 (M) | 979 (W) |
| 1,659 (W) | 1,284 (S) | 939 (W) |
| 1,654 (W) | 1,255 (S) | 914 (W) |
| 1,621 (S) | 1,224 (S) | 884 (W) |
| 1,611 (S) | 1,199 (M) | 864 (W) |
| 1,569 (M) | 1,184 (M) | 838 (W) |
| 1,559 (W) | 1,139 (M) | 823 (W) |
| 1,554 (W) | 1,119 (M) | 809 (W) |
| 1,544 (W) | 1,104 (M) | 792 (W) |
| 1,489 (W) | 1,089 (W) | 779 (W) |
| 1,454 (S) (oil) | 1,075 (W) | 759 (W) |
| 1,409 (M) | 1,055 (M) | 729 (W) |
| 1,379 (S) (oil) | 1,046 (M) | 709 (W) |
| 1,364 (M) | 1,005 (M) | 684 (W) |

*Solubility.*—Soluble in dilute acid and base (0.1 to 2 N), chloroform, benzene, dimethylformamide, and acetone. Relatively insoluble in hexane, cyclohexane, carbon tetrachloride, and alcohols.

*Optical rotation.*—$[\alpha]_D^{25}+843°$ (c., 0.03 in $CHCl_3$).

CHEMICAL AND PHYSICAL PROPERTIES OF O-METHYLNOGALAROL

*Elemental analysis.*—Calculated for $C_{30}H_{33}NO_{13}$ (percent): C, 58.54; H, 5.40; N, 2.28. Found (percent): C, 58.35; H, 5.96; N, 2.34.

*Equivalent weight.*—Calculated: 615.6. Found: 612.

*Solubility.*—Soluble in dilute acids and bases (0.1 to 2 N), methanol, dimethylformamide and acetone; relatively insoluble in halogenated solvents and hydrocarbons.

*Optical rotation.*—$[\alpha]_D^{25}=+584°$ (c., 0.059 in $CHCl_3$).

*Titration.*—pKa 6.8.

*Ultraviolet spectrum.*—O-methylnogalarol has the following UV absorption spectrum in $CH_3OH$:

| λ Max. (mμ) | ε |
|---|---|
| 236 | 55,100 |
| 258 | 22,400 |
| 289 | 9,050 |
| 468 | 15,400 |

*Melting point.*—199–202° C.

*Color of crystals.*—Red-orange.

*Infrared spectrum.*—The infrared adsorption spectrum of O-methylnogalarol suspended in mineral oil mull is reproduced in FIGURE 3 of the drawing. O-methylnogalarol gives bands at the following wave lengths expressed in reciprocal centimeters:

| | | |
|---|---|---|
| 3,440 (S) | 1,509 (W) | 1,049 (S) |
| 2,940 (S) (oil) | 1,499 (M) | 1,035 (M) |
| 2,920 (S) (oil) | 1,459 (S) | 1,018 (M) |
| 2,850 (S) (oil) | 1,414 (S) | 1,004 (S) |
| 2,790 (W) | 1,389 (M) | 980 (W) |
| 1,739 (M) | 1,379 (S) | 941 (W) |
| 1,734 (M) | 1,300 (M) | 929 (W) |
| 1,731 (M) | 1,284 (M) | 909 (W) |
| 1,719 (M) | 1,249 (S) | 885 (W) |
| 1,660 (M) | 1,222 (S) | 859 (W) |
| 1,654 (M) | 1,204 (S) | 833 (W) |
| 1,620 (M) | 1,159 (M) | 830 (W) |
| 1,605 (M) | 1,149 (S) | 775 (M) |
| 1,589 (W) | 1,136 (S) | 759 (W) |
| 1,570 (M) | 1,119 (S) | 724 (W) |
| 1,559 (W) | 1,094 (S) | 665 (W) |

ANTIBIOTIC ACTIVITY OF NOGALAROL, O-METHYLNOGALAROL AND NOGALARENE

The antibacterial activity of nogalarol and O-methylnogalarol in disc-plate agar diffusion tests is given in the following table:

| | Zone sizes, mm. | |
|---|---|---|
| Test organism | Nogalarol | O-methylnogalarol |
| Bacillus subtilis | 12 | 18 |
| Bacillus cereus | 8 | 10 |
| Sarcina lutea | 15 | 17 |
| Streptococcus fecalis | 8 | 13 |
| Mycobacterium phlei | 11 | 15 |
| Klebsiella pneumoniae | 8 | 13 |
| Lactobacillus casei | 13 | 21 |
| Rhodopseudomonas spheroides | 8 | 8 |
| Propionibacterium thonii | 18 | 22 |

The above antibacterial tests were run by dipping 6-mm. filter paper discs into a 1 mg./ml. solution of the test substance in methanol (uptake about 20 microliters/disc) and placing the discs on agar plates containing a 1.3 mm. layer of agar freshly seeded with the test organism. Discs dipped in methanol alone gave no inhibition zones. The agar media used, available from the Difco Company, Detroit, Mich., were as follows: for *B. subtilis* and *K. pneumoniae*, streptomycin agar; for *B. cereus*, and *S. lutea*, Penassay agar; for *L. casei*, thioglycollate agar; for *M. phlei* and *S. fecalis*, brain heart infusion agar; for *R. spheroides*, 1% yeast extract agar; and for *P. thonii*, 1% yeast extract, 2% sodium lactate agar. The plates were incubated 18 to 24 hours at 37° C., except for those containing *S. lutea* which were incubated at 32° C., before reading the zones.

The antibacterial spectrum of the novel compounds of the invention, as determined by a tube dilution assay, is shown in the following table. The test was run with the medium being BHI (brain heart infusion broth, Difco, Detroit, Michigan). Assay tubes (13 mm. x 100 mm.) were prepared in the customary manner as set out in Snell, E. E., Vitamin Methods, vol. 1, Academic Press, Inc., New York, 1950, p. 327. Test organisms grown for 18 hrs. at 37° C. were used to inoculate the test medium. The assays were read after 17 hrs. at 37° C.

| | Minimum inhibitory concentration | | |
|---|---|---|---|
| Test organism | Nogalarol | Methyl-nogalarol | Nogalarene |
| Bacillus subtilis | 6.25 | 6.25 | 1.56 |
| Staphylococcus aureus | 12.5 | 12.5 | 50 |
| Staphylococcus albus | 25 | 25 | 100 |
| Klebsiella pneumoniae | 25 | 50 | >100 |

Nogalarol and O-methylnogalarol also show antiprotozoal activity. When tested by a disc-plate diffusion assay, as described above, these compounds inhibited the protozoan *Crithidia fasciculata*. The test agar medium used contained the following ingredients/1. of medium: 10 g. of glucose monohydrate, 20 g. of Proteose peptone (Difco), 2 g. of Yeastolac (Difco), 1.2 g. of disodium hydrogen phosphate, 0.8 g. of potassium dihydrogen phosphate, 10 ml. of 2% Blood Powder Solution (Difco), and 10 ml. of Penicillin-streptomycin solution (Difco), at a pH of 7.85. The plates were incubated at 28° C. for 18 to 24 hrs. Nogalarol gave a 10 mm. inhibition zone against *Crithidia fasciculata*, whereas O-methylnogalarol gave a 13 mm. zone of inhibition.

Nogalarol, O-methylnogalarol, and nogalarene also are active against KB cells in tissue cuture, having $ID_{50}$ values of 0.27, 0.098–0.165, and 0.56 mcg./ml., respeceively.

It has now been found that novel compounds according to this invention are obtained by acid hydrolysis of nogalamycin. Nogalamycin, which has the empirical $C_{39}H_{49}NO_{17}$, is a basic compound. In the process of this invention, nogalamycin is cleaved yielding two antimicrobially-active compounds which have been given the names nogalarol, having an empirical formula $C_{29}H_{31}NO_{13}$, and nogalarene, having an empirical formula $C_{29}H_{27}NO_{11}$. Nogalamycin, either in the form of the free base or in the form of an acid addition salt, is contacted with an acidic material, e.g., a mineral acid such as hydrogen chloride, hydrogen bromide, hydrogen iodide, sulfuric acid, phosphoric acid, and the like. Preferably, hydrochloric acid is used as the hydrolyzing agent. For example, upon contacting nogalamycin with 0.4 to 2.0 N hydrochloric acid at reflux, there is obtained a reaction mixture comprising nogalarol and nogalarene. The reaction can be conducted at a temperature of 0° C. to reflux. Reflux is preferred as lower temperatures prolong the completion of the reaction. Nogalarol and nogalarene are separated conveniently from the reaction mixture, and from each other, by subjecting the reaction mixture to countercurrent distribution using a solvent system consisting of benzene-chloroform-methanol-water (25:25:30:20).

Upon treating nogalamycin or nogalarol with methanol in an acidic solution, there is produced O-methylnogalarol. For example, upon reacting nogalamycin with anhydrous methanol in hydrogen chloride at reflux for about 2 hr., there is obtained O-methylnogalarol. Other mineral acids can be used, for example, hydrogen bromide, hydrogen iodide, sulfuric, phosphoric, and the like. Hydrochloric acid is preferred. The reaction can be conducted at a temperature of 0° C. to reflux; reflux is preferred.

O-methylnogalarol can be recovered from the reaction solution by extraction with clororform at a basic pH, e.g., about 7.0–7.5. The resulting crude product of O-methylnogalarol can be purified, conveniently, by countercurrent distribution using the solvent system benzene-chloroform-methanol-water (25:25:37.5:12.5).

O-methylnogalarol can be converted to nogalarene by acidic hydrolysis using the conditions disclosed above for producing nogalarene from nogalamycin. Nogalarene can be recovered, conveniently, from the reaction by countercurrent distribution using a solvent system consisting of benzene-chloroform-methanol-water (25:25:30:20).

Nogalarol, O-methylnogalarol, and nogalarene can be purified by subjecting the fractions from the countercurrent distribution to crystallization and recrystallization from a lower alkanol, for example, methanol.

The new compounds of the invention also can be purified by successive transfers from protonated to non-protonated forms and vice versa, especally with other types of treatment intervening, for example, solvent extractions and washings, chromatography, and fractional-liquid extraction. In this manner salts of nogalarol, O-methyl-nogalarol, and nogalarene can be employed to isolate or upgrade these compounds. For example, nogalarol, O-methylnogalarol, and nogalarene can be converted to an insoluble salt, such as the picrate, which can be subjected to purification procedures and then used to regenerate the antibiotics in their free base form by treatment with alkali. Or, the antibiotics can be converted to water-soluble salts, such as the hydrochloride or sulfate, and the aqueous solutions of the salt extracted with various water-immiscible solvents before regenerating the antibiotics in their free base form by treatment with alkali of the thus-extracted acid solution.

Salts or nogalarol, O-methylnogarol, and nogalarene can be used for the same biological purposes as the free base, or they can be employed to upgrade the antibiotics as previously described.

Sepecific acid salts can be made by neutralizing the free base of nogalarol, O-methylnogalarol, and nogalarene with the appropriate acid to below about pH 7.5, and advantageously to about pH 2 to pH 6. Suitable acids for this purpose include hydrochloric, sulfuric, phosphoric, acetic, succinic, citric, lactic, maleic, fumaric, pamoic, chloic, palmitic, mucic, amphoric, glutaric, glycolic, phthalic, tartaric, lauric, stearic, salicylic, 3-phenylsalicylic, 5-phenylsalicylic, 3-methylglutaric, o-sulfobenzoic, cyclohexanesulfamic, cyclopentanepropionic, 1,2 - cyclohexanedicarboxylic, 4 - cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and the like acids.

Nogalarol, O-methylnogalarol, and nogalarene are active against *Bacillus subtilus* and can be used to minimize or prevent odor in fish and fish crates caused by this organism. The new compounds can be used as disinfectants on various dental and medical equipment contaminated with *Staphlococcus aureus*; they also can be used as disinfectants on washed and stacked food utensils contaminated with *Staphlococcus aureus*. Nogalarol, O-methylnogalarol, and nogalarene also can be used for treating breeding places of silkworms to prevent or minimize infections caused by *Bacillus subtilis*.

Since nogalarol inhibits the group of the protozoan *Crithidia fasciculata*, it can be used in cleaning solutions to cleanse laboratory assay plates containing this protozoan.

Nogalarol and O-methylnogalarol unexpectedly demonstrate a lower degree of toxicity than nogalamycin in mice. When administered intravenously to mice, nogalarol and O-methylnogalarol have $LD_{50}$ values of greater than 25 and 87 mg./kg., respectively, whereas nogalamycin has a value of 8.8 mg.kg. The value for nogalarene is 8.8 mg./kg.

The following examples are illustrative of the process and products of the present invention, but art not to be construed as limiting. All percentages are by weight and all solvent mixture proportions are by volume unless otherwise noted.

EXAMPLE 1

A solution of 25 g. of nogalamycin in 500 ml. of 0.4 N HCl was refluxed for ½ hr. The reaction mixture was then cooled and extracted with four 250-ml. portions of chloroform. The aqueous solution was adjusted to pH 7.0 with $NaHCO_3$. The neutral solution was refrigerated overnight and then filtered. The filtrate was allowed to stand at room temperature for 1 day and filtered again. The solids obtained from the filtrations were combined after air drying; yield 17.2 g. Nine grams of this crude product was subjected to countercurrent distribution in a 200-tube 50-ml./phase machine using benzene-chloroform-methanol-water (25:25:30:20) as the solvent system. Five hundred transfers were run and the upper phases were collected. The fractions from tubes 14–64 were combined and labeled Pool No. 1; fractions from tubes 65–120 were combined and labeled Pool No. 2; and fractions from tubes 121–133 were combined and labeled Pool No. 3. Pools No. 1 and 2 were evaporated to dryness under reduced pressure. Pool No. 1 (4.3 g.) contained a mixture of nogalamycin and nogalarene. Pool No. 2 (0.89 g.) was mostly nogalarene. Pool No. 1 can be purified further by countercurrent distribution to obtain more nogalarene. Pool No. 3 was concentrated under reduced pressure to a volume of about 3 liters. The solid precipitate which formed was removed by filtration and air dried; yield 3.24 g. of nogalarol containing a small amount of a second compound. Evaporation of the filtrate under reduced pressure gave 0.96 g. of a material which was nearly pure nogalarene. The purity of nogalarol and nogalarene was judged by thin layer chromatography using silica gel plates and a solvent system composed of chloroform-methanol-water (78:20:2). The $R_f$ values are: nogalarol=0.16; nogalarene=0.37.

A portion of the nogalarol, obtained above from Pool No. 3, was recrystallized twice from methanol to give pure nogalarol as red needles. These crystals decompose at about 220° C. with no definite melting point.

Nogalarene, obtained above from Pool No. 2, was purified by dissolving in boiling methanol and adding Skellysolve B (isomeric hexanes) to give a precipitate. This precipitate was then recrystallized from benzene. The nogalarene crystals which were obtained decomposed at about 230° C. with no definite melting point.

EXAMPLE 2

A solution of 25 g. of nogalamycin in 1250 ml. of anhydrous methanol 2 N in hydrogen chloride (prepared by adding 178 ml. of acetyl chloride to the methanol) was refluxed for 2 hr. The solution was concentrated under reduced pressure to about 500 ml. One liter of water was added, and the mixture was extracted with four 250-ml. portions of chloroform. The aqueous solution was adjusted to pH 7.2 with 50% sodium hydroxide solution and extracted with one 500-ml. portion of chloroform, and three 250-ml. portions of chloroform. The combined chloroform extracts were washed with 200 ml. of water. Evaporation of the chloroform solution under reduced pressure gave 22.2 g. of a dark red solid residue containing O-methylnogalarol. This crude product was purified by countercurrent distribution using the solvent system benzene-chloroform-methanol-water (25:25:37.5:12.5)

for 200 transfers. The contents of tubes 33–75 were combined, diluted with water and the lower phase was removed. The upper phase was extracted with chloroform and the extract was added to the lower phase removed above. The combined chloroform solutions were evaporated under reduced pressure to dryness. The resulting residue was dissolved in 5 ml. of chloroform and 100 ml. of methanol was added. The solution was refrigerated and then filtered; yield, 3.60 g. of red crystals of O-methylnogalarol. The purity of the crystalline O-methylnogalarol was ascertained by thin-layer chromatography with silica gel using the solvent system chloroform-methanol-water (78:20:2). O-methylnogalarol has an $R_f$ value of 0.54.

The red crystals of O-methylnogalarol, obtained above, were purified further by dissolving the crystals in 1.5 ml. of chloroform per gram of crystals, and diluting the solution with 9 volumes of hot methanol. The solution was then filtered and refrigerated. Upon cooling, red-orange crystalline O-methylnogalarol appeared and it was recovered by filtration. The crystalline O-methylnogalarol had a M.P. of 199–202° C.

*Elemental analysis.*—Calculated for $C_{30}H_{33}NO_{13}$ (percent): C, 58.54; H, 5.40; N, 2.28. Found (percent): C, 58.35; H, 5.96; N, 2.34.

*Equivalent weight.*—Calculated: 615.6. Found: 612.

EXAMPLE 3

By substituting the nogalamycin in Example 2 by nogalarol, as prepared in Example 1, there is obtained O-methylnogalarol.

Any right, title, and interest in or to the invention described and claimed herein, or any patent which may issue thereon, shall be subject to the provisions of Alternate Clause 20 of HEW Contract No. PH 43–62–168.

We claim:
1. The antibiotic nogalarol, a compound which:
 (a) is effective in inhibiting the growth of various Gram-positive and Gram-negative bacteria;
 (b) is soluble in dilute acid and base (0.1 to 2 N), methanol, dimethylformamide, and acetone; and relatively insoluble in propanol, butanol, chloroform and methylene chloride;
 (c) has the following elemental analysis: C, 57.66; H, 5.42; N, 2.34; O, 32.00;
 (d) has an equivalent weight of 558;
 (e) has a characteristic ultraviolet absorption spectrum as follows in $CH_3OH$:

| λ Max. | ε |
|---|---|
| 234 | 53,250 |
| 258 | 24,600 |
| 288 (sh.) | 9,850 |
| 475 | 15,400 | and
 (f) has a characteristic infrared absorption spectrum as shown in FIGURE 1 of the accompanying 2. The antibiotic nogalarene, a compound which:
 (a) is effective in inhibiting the growth of various Gram-positive and Gram-negative bacteria;
 (b) is soluble in dilute acid and base (0.1 to 2 N); chloroform, benzene, dimethylformamide, and acetone; relatively insoluble in hexane, cyclohexane, carbon tetrachloride, and alcohols;
 (c) has the following elemental analysis: C, 61.73; H, 5.51; N, 2.56;
 (d) has an equivalent weight of 564;
 (e) has a characteristic ultraviolet absorption spectrum as follows in $CH_3OH$:

| λ Max. | ε |
|---|---|
| 248 | 49,800 |
| 270 | 28,880 |
| 290 (sh.) | 16,300 |
| 303 (sh.) | 14,900 |
| 480 | 18,700 | and
 (f) has a characteristic infrared absorption spectrum as shown in FIGURE 2 of the accompanying drawing.

3. The antibiotic O-methylnogalarol, a compound which:
 (a) is effective in inhibiting the growth of various Gram-positive and Gram-negative bacteria;
 (b) is soluble in dilute acids and bases (0.1 to 2 N), methanol, dimethylformamide and acetone; relatively insoluble in halogenated solvents and hydrocarbons;
 (c) has the following elemental analysis: C, 58.35; H, 5.96; N, 2.34;
 (d) has an equivalent weight of 612;
 (e) has a characteristic ultraviolet absorption spectrum as follows in $CH_3COH$:

| λ Max. | ε |
|---|---|
| 236 | 55,100 |
| 258 | 22,400 |
| 289 | 9,050 |
| 468 | 15,400 | and
 (f) has a characteristic infrared absorption spectrum as shown in FIGURE 3 of the accompanying drawing.

4. The acid addition salts of the compound defined in claim 1.

5. The acid addition salts of the compound defined in claim 2.

6. The acid addition salts of the compound defined in claim 3.

7. The process for producing nogalarol, the compound defined in claim 1, which comprises adding nogalamycin to a mineral acid selected from the group consisting of hydrogen chloride, hydrogen bromide, hydrogen iodine, sulfuric, and phosphoric of from about 0.4 to 2.0 N, at a temperature of 0° C. to reflux, to cleave nogalamycin to produce a reaction mixture containing nogalarol and nogalarene, as defined in claim 2, and subjecting said reaction mixture to countercurrent distribution to recover nogalarol.

8. The process for producing nogalarene, the compound defined in claim 2, which comprises adding nogalamycin to a mineral acid selected from the group consisting of hydrogen chloride, hydrogen bromide, hydrogen iodide, sulfuric, and phosphoric of from about 0.4 to 2.0 N, at a temperature of 0° C. to reflux to cleave nogalamycin to produce a mixture containing nogalarene and nogalarol, as defined in claim 1, and subjecting said reaction mixture to countercurrent distribution to recover nogalarene.

9. The process for producing 0-methylnogalarol, a compound defined in claim 3, which comprises adding nogalamycin or nogalarol to a solution of a mineral acid selected from the group consisting of hydrogen bromide, hydrogen iodide, sulfuric, and phosphoric, in methanol, at a temperature of 0° C. to reflux and extracting the O-methylnogalarol from the reaction mixture at about a pH of 7.0.

References Cited

UNITED STATES PATENTS 3,183,157   5/1965   Bhuyaw et al. _____ 424—120

ALBERT T. MEYERS, Primary Examiner

JEROME D. GOLDBERG, Assistant Examiner

U.S. Cl. X.R.

424—120, 121, 124

UNITED STATES PATENT OFFICE
CERTIFICATE OF CORRECTION

Patent No. 3,501,569  Dated  March 17, 1970

Inventor(s) Paul F. Wiley et al.

It is certified that error appears in the above-identified patent and that said Letters Patent are hereby corrected as shown below:

Column 2, line 34, "2.950" should read -- 2,950 --. Column 3, line 17, "2.940" should read -- 2,940 --. Column 4, line 47, "Minimum Inhibitory Concentration" should read -- Minium Inhibitory Concentration in mcg./ml.       --.

Column 5, line 66, "or" should read -- of --; line 66, "methylnogarol" should read -- methylnogalarol --; line 70, "Sepecific" should read -- Specific --. Column 6, line 1, "amphoric" should read -- camphoric --; line 31, "mg.kg." should read -- mg./kg. --; line 34, "art" should read -- are --. Column 8, line 10, "accompanying" should read -- accompanying drawing. --; line 66, "iodine" should read -- iodide --. Column 10, line 5, "Bhuyaw" should read -- Bhuyan --.

Signed and sealed this 9th day of March 1971.

(SEAL)
Attest:

EDWARD M. FLETCHER, JR.
Attesting Officer

WILLIAM E. SCHUYLER, JR.
Commissioner of Patents